Nov. 1, 1932.   F. QUINN ET AL   1,886,044
MACHINE FOR THE SCUTCHING, OPENING, AND LIKE TREATMENT
OF COTTON AND LIKE FIBROUS MATERIALS
Filed May 6, 1931
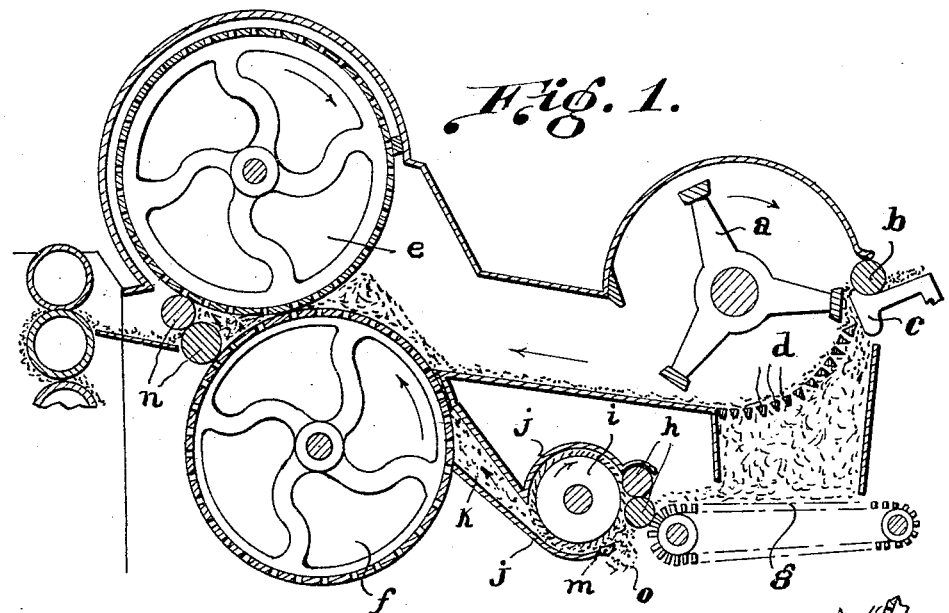
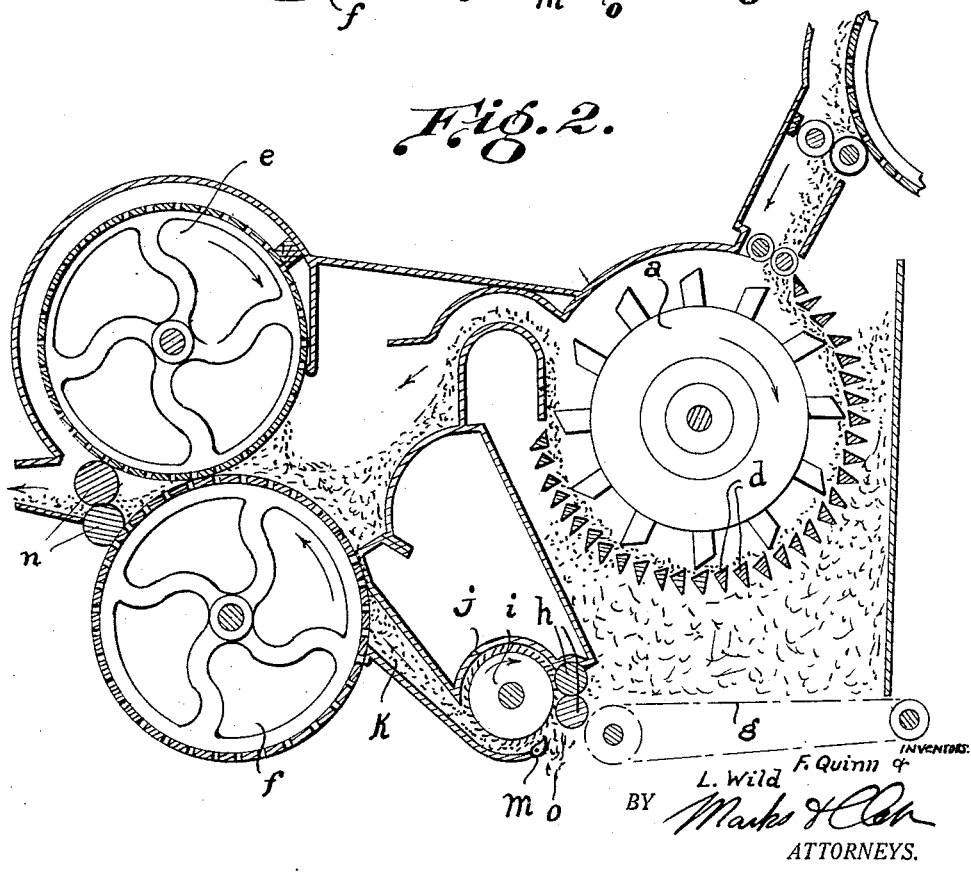

Patented Nov. 1, 1932

1,886,044

UNITED STATES PATENT OFFICE

FRANK QUINN AND LEONARD WILD, OF BOLTON, ENGLAND

MACHINE FOR THE SCUTCHING, OPENING, AND LIKE TREATMENT OF COTTON AND LIKE FIBROUS MATERIALS

Application filed May 6, 1931, Serial No. 535,508, and in Great Britain May 7, 1930.

This invention relates to machines for scutching, opening and like treatments of cotton and like fibrous materials, and has for its object to provide simple and effective means for reducing the loss of fibrous material during the opening or like process whereby economy in working is secured whilst the fibers are free from the sand, leaf, stalk, small neps and the like associated therewith prior to opening.

In accordance with our invention, the mixed sand, leaf, stalk, neps and like impurities which are associated with a certain amount of the cotton or like fibrous material under treatment are collected after delivery through the usual grid adjacent to beneath the rotary beater (which may be of the ordinary or of the porcupine type) or the cylinder or the beaters or cylinders of the scutching, opening or like machine by means of a slow motion lattice or the like and delivered through feed rollers on to a high speed saw tooth roll or cylinder in conjunction with which is arranged a suction chute having a blade or blades arranged at its entrance end adjacent to the periphery of said saw tooth roll or cylinder as described in prior Patent Specification No. 1,661,089.

The said high speed roll or cylinder in conjunction with said blade or blades (the latter being adjustable if desired) effect a very thorough separation of fibrous material from the impurities delivered by the beater or cylinder of the scutching or opening machine. The said separated fibrous material is then returned to the main machine at a convenient point where a sufficient suction pull is available and mixed with the main stream of fibrous material which may then be made into lap form if desired. Said convenient point may be the bottom cage of the machine or the bottom plate or grid bars between the beater or cylinder and the upper and lower cages.

Referring to the accompanying sheet of explanatory drawing:—

Figure 1 is a sectional elevation illustrating the application of our invention to a scutching machine.

Figure 2 is a view similar to Figure 1, but showing the application of our invention to an exhaust opener.

The same reference letters in the two views indicate the same or similar parts.

In Figure 1, $a$ indicates the beater which acts upon the cotton fed into the machine between the feed roller $b$ and pedal lever $c$, and $d$ the grid bars through which leaf and stalk mixed with cotton fiber is thrown by the action of the beater. The cotton from the beater cylinder then passes to the dust cages $e$ and $f$ to which exhaustion is applied in the known manner. In accordance with our invention, we provide a feed lattice $g$, beneath the grid bars $d$ to receive the leaf, stalk, and fiber delivered therethrough and to feed the same to feed rollers $h$ which pass it to a high speed saw tooth roller $i$ which is surrounded except for a part beneath and adjacent to the feed rollers $h$ by a casing $j$ leading to a duct $k$ which enters the main delivery passage from the beater cylinder and puts the said duct $k$ and the space around the saw tooth roller under the suction existing in the machine due to the exhaustion action of the cages $e$ and $f$. At the entrance to the casing $j$ beneath the saw tooth roller, we provide a blade $m$ which extends the full width of the saw tooth roller and is pivotally carried by the casing $j$ so that its edge can be adjusted to bring it close to the periphery of the saw tooth roller. The action of the latter causes the fibers to be drawn over the blade and results in an efficient separation from the fibers of the impurities contained therein. The cleaned cotton or like fibers return to the main stream from the beater $a$ and pass out of the machine at the delivery rolls $n$.

The material separated from the fibers fed to the saw tooth roller $i$ is delivered at $o$ and is collected by suitable means, not shown.

Figure 2 shows our invention applied to an exhaust opener of the porcupine type. The construction will be readily understood by comparison of the parts with Figure 1.

The cleaned fibers from the saw tooth roller $i$ may be passed into the main stream of fibers at any convenient point where the suction of the dust cages $e$ and $f$ is operative.

Such point may be actually at the surface of a cage or in the track leading to the cage.

By our improvement we are enabled to adapt the ordinary scutching, opening or like machine to reclaim the fibrous material which is ordinarily thrown out with the separated impurities. In addition, the grid beneath the cylinder can be worked with the bars more open, which gives advantages when treating fibers containing a large amount of leaf and stalk without involving the loss of the fibrous material itself as the latter is reclaimed as before described.

What we claim is:—

1. In machines for the scutching, opening and like treatment of cotton and like fibrous materials, comprising a casing, scutching or opening means at the feed end of said casing, grate bars disposed beneath said scutching or opening means, and means for applying suction at the delivery end of said casing, the combination of a slow motion lattice beneath said grate bars for receiving the leaf, stalk and fibers discharged through said grate bars, means associated with said slow motion lattice for subjecting said fibers to a cleaning treatment, a casing surrounding said means and means for applying the suction of the scutcher, opener or the like to said means, substantially as set forth.

2. In machines for the scutching, opening and like treatment of cotton and like fibrous materials comprising a casing, scutching or opening means at the feed end of said casing, grate bars disposed beneath said scutching or opening means and means for applying suction at the delivery end of said casing, the combination of a slow motion lattice beneath said grate bars for receiving the leaf, stalk and fibers discharged through said grate bars, a high speed saw tooth roller adjacent one end of said slow motion lattice, a blade extending the width of and adjacent to said saw tooth roller beneath the latter, a casing surrounding said saw tooth roller and means for applying the suction of the scutcher, opener or the like to said means, substantially as set forth.

3. In machines for the scutching, opening and like treatment of cotton and like fibrous materials, comprising a casing, scutching or opening means at the feed end of said casing, grate bars disposed beneath said scutching or opening means and means for applying suction at the delivery end of said casing, the combination of a slow motion lattice beneath said grate bars for receiving the leaf, stalk, and fibers discharged through said grate bars, means associated with said slow motion lattice for subjecting said fibers to a cleaning treatment, a casing surrounding said means and means for applying the suction of the scutcher, opener or the like to said means, to return the cleaned fibers to the main stream of fibers at the surface of the bottom dust cage of said scutching or opening machine, substantially as set forth.

In testimony whereof we have signed our names to this specification.

FRANK QUINN.
LEONARD WILD.